(12) United States Patent
Ding

(10) Patent No.: US 6,594,563 B1
(45) Date of Patent: Jul. 15, 2003

(54) METHOD AND DEVICE FOR MONITORING A PLURALITY OF SENSORS DETECTING A PROCESS, NOTABLY FOR AN ESP SYSTEM FOR VEHICLES

(75) Inventor: Eve Limin Ding, Senftenberg (DE)

(73) Assignee: Continental Teves, AG & Co. OHG, Frankfurt (DE)

(*) Notice: Subject to any disclaimer, the term of this patent is extended or adjusted under 35 U.S.C. 154(b) by 0 days.

(21) Appl. No.: 09/913,147

(22) PCT Filed: Jan. 25, 2000

(86) PCT No.: PCT/EP00/00537
§ 371 (c)(1),
(2), (4) Date: Jan. 16, 2002

(87) PCT Pub. No.: WO00/48882
PCT Pub. Date: Aug. 24, 2000

(30) Foreign Application Priority Data

Feb. 18, 1999 (DE) .......................... 199 06 795
Aug. 3, 1999 (DE) .......................... 199 36 434

(51) Int. Cl.$^7$ ............................................ G01M 17/00
(52) U.S. Cl. .............................. 701/34; 701/41; 701/63; 303/140; 303/183
(58) Field of Search .............................. 701/22, 34, 36, 701/63, 70, 107, 41; 303/140, 146, 183

(56) References Cited

U.S. PATENT DOCUMENTS

| | | | | |
|---|---|---|---|---|
| 5,415,641 A | * | 5/1995 | Yerlikaya et al. ........... | 604/251 |
| 5,691,903 A | * | 11/1997 | Racette, III ................. | 701/207 |
| 6,122,577 A | * | 9/2000 | Mergenthaler et al. ....... | 701/34 |
| 6,226,581 B1 | * | 5/2001 | Reimann et al. .............. | 701/48 |

FOREIGN PATENT DOCUMENTS

| | | |
|---|---|---|
| DE | 196 36 443 | 3/1998 |
| DE | 197 08 508 | 3/1998 |
| DE | 197 49 058 | 1/1999 |
| EP | 0 716 000 | 11/1995 |

* cited by examiner

*Primary Examiner*—Gertrude Arthur

(57) ABSTRACT

A method and device for monitoring a plurality of sensors detecting a process comprising the following steps: detecting time variations of the output signals of the sensors, comparing and testing the variations in view of their plausibility which is determined by the dependencies of the sensor output signals given by the process, and producing an error message (FM) in the absence of plausibility. A preferred application of the present method prevails in an ESP system for vehicles which is controlled by a microprocessor unit, wherein the process is the electronic driving stability program, and the sensors comprise a yaw rate sensor, a transverse acceleration sensor, and a steering angle sensor, and the method is implemented by a subprogram in the microprocessor unit.

7 Claims, 3 Drawing Sheets

METHOD AND DEVICE FOR MONITORING A PLURALITY OF SENSORS DETECTING A PROCESS, NOTABLY FOR AN ESP SYSTEM FOR VEHICLES

TECHNICAL FIELD AND BACKGROUND OF THE INVENTION

The invention relates to a method and a device for monitoring a plurality of sensors detecting a process, and the process may notably be an "Electronic Stability Program" (ESP) for vehicles.

Electronic stability programs of this type are driving-dynamics control systems for vehicles which are used to assist the driver in critical driving situations during braking, accelerating and steering, and to intervene where the driver himself/herself has no direct intervention possibility. The control system assists the driver when braking, especially on a roadway with a low or varying coefficient of friction, on which the vehicle might be no longer steerable due to locking wheels or might start to skid; it further assists in accelerating, there being the risk of spinning of the driven wheels, and finally when steering during cornering, where the vehicle might oversteer or understeer. In total, not only the comfort but also the active safety will be improved considerably.

A control system of this type is based on a closed-loop control circuit which, during normal operation of the vehicle, takes over typical control tasks and is intended to stabilize the vehicle as quickly as possible in extreme driving situations. Sensors to sense the various driving-dynamics parameters are of special importance as generators of actual values. The precondition for a plausible control is that the sensors correctly represent the actual condition of the controlled system. This is particularly important in driving stability control operations in extreme driving situations, where a control deviation must be adjusted by the control already within a very short time. This is the reason why the ESP sensors (yaw rate sensor, transverse acceleration sensor, steering angle sensor) of an electronic Stability program require constant monitoring in order to detect faults, in the sensors at an early point of time and rule out a faulty control which might cause a vehicle condition that is critical in terms of safety.

ESP sensors may e.g. suffer from so-called connecting errors. These errors cause malfunctions which involve that the sensors permanently indicate constant values in their useful range so that driving dynamics cannot be represented correctly. It cannot be ruled out in certain driving stiuations with low dynamics that such a connecting error stays undiscovered.

SUMMARY OF THE INVENTION

In view of the above, an object of the present invention is to provide a method and a device for monitoring a plurality of sensors detecting a process, such as an electronic stability program (ESP) for vehicles, which permits considerably reducing the risk of a wrong measurement due to connecting errors of the sensors.

This object is achieved by means of a method of the above-mentioned type which is characterized by the following steps: detecting time variations of the output signals of the sensors, comparing and checking the variations in view of their plausibility, which is determined by the dependencies of the sensor output signals caused by the process, and producing an error message. In the absence of plausibility.

Further, this object is achieved by a device which includes a connecting error detection unit with a first device for detecting time variations of the output signals of the sensors and a second device for comparing and checking the variations in view of their plausibility which is determined by the dependencies of the sensor output signals caused by the process, and producing an error message in the absence of plausibility.

In a particularly favorable manner, the present invention can be combined with an ESP system for vehicles which is controlled by a microprocessor unit, wherein the process is the electronic driving stability program, and the sensors comprise a yaw rate sensor, a transverse acceleration sensor, and a steering angle sensor, and the first and second device is implemented by a subprogram in the microprocessor unit.

The present invention is especially suited for the combination with a model-based monitoring of the sensors of an electronic stability program (ESP) for vehicles which is described in the parallel application No. 199 29 155.1 and by reference herewith shall be made a part of the disclosure of this invention. In that system, respectively one of the sensors is monitored in that its output signal is compared with analytical reference values (redundancies) which are determined by means of a multi-process model from process reference variables or process measured variables that are not monitored currently. However, even with this system it cannot be fully excluded that the connecting errors explained hereinabove will remain undiscovered. The present invention provides a remedy for these cases.

Additional benefits and advantages of the present invention will become apparent to those skilled in the art to which this invention relates from the subsequent description of the preferred embodiment and the appended claims, taken in conjunction with the accompanying drawing.

BRIEF DESCRIPTION OF THE DRAWINGS

The drawings that will now be briefly discussed are incorporated herein to illustrate preferred embodiments of the invention and a best mode presently contemplated for carrying out the invention.

DETAILED DESCRIPTION OF THE INVENTION

Figure 1:
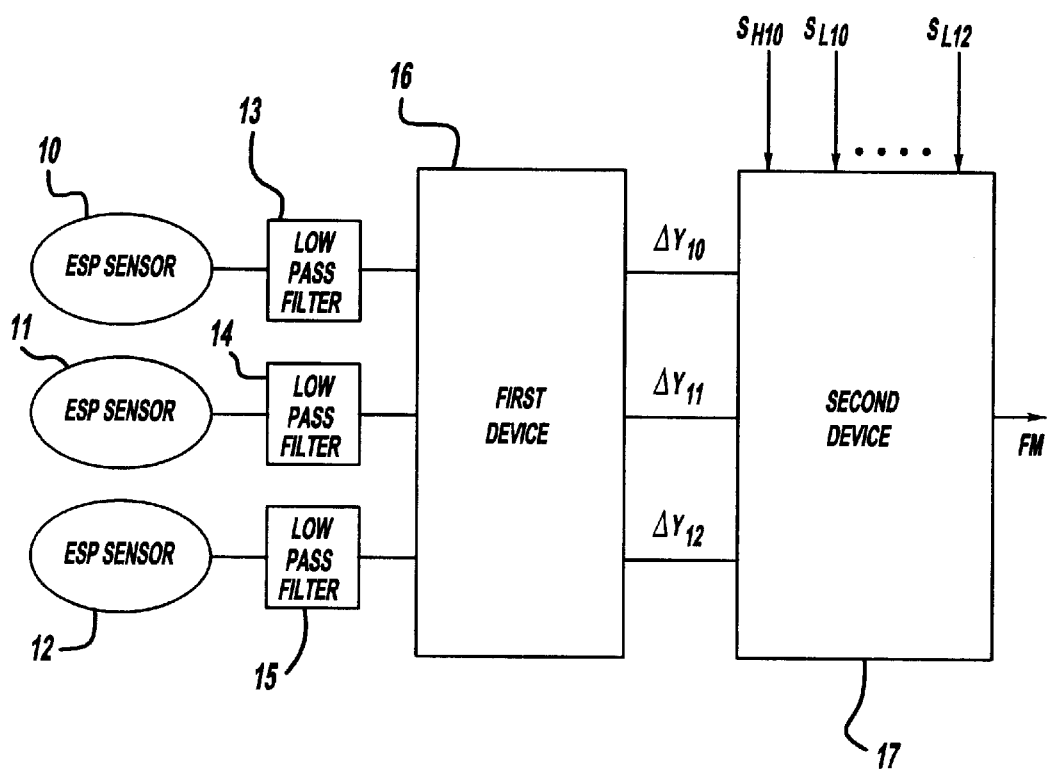
FIG. 1 is a schematic block diagram of a device according to the present invention.

The following description of the preferred embodiment of the invention is not intended to limit the scope of the invention that is described, but rather to enable a person skilled in the art to make and use the invention. Referring to the drawings, like reference numerals are used to designate like parts throughout.

A basic principle of the monitoring method involves performing a plausibility test on the basis of the physical relations of the output signals of the different sensors detecting a process for discovering connecting errors, by taking into consideration an analysis of characteristics of the sensor signals in the event of a connecting error. Monitoring can be performed cyclically at predetermined intervals.

Tests have shown that in the event of a connecting error the ESP sensors will generate output signals irrespective of driving maneuvers, the said output signals presenting exclusively stochastic signals such as measurement noise induced by hardware. For this reason, it must be expected that the output signals extend quasi constantly after a low-pass filtering operation. Thus, a test of the variation of the sensor signals permits an effective analysis of characteristics by which the connecting errors can be detected.

The plausibility test is based on the following reflections: when a vehicle performs the normal driving maneuvers, which shall refer to stationary straight travel, stationary circular travel and the usual slalom maneuvers, for example, the relationship between the output signals of the three ESP sensors (yaw rate sensor, steering angle sensor, transverse acceleration sensor) in the failfree case can be described as follows:

$$\dot{\psi} = \frac{\delta_L}{i_L l} \frac{v_{ref}}{\left(1 + \left(\frac{v_{ref}}{v_{ch}}\right)^2\right)}$$

and $\alpha_q = v_{ref} \dot{\psi}$ (equation 1)

wherein $v_{ref}$ vehicle reference speed $\dot{\psi}$ yaw rate $\alpha_q$ transverse acceleration $\delta_L$ steering wheel angle $i_L$ steering ratio l wheel base $V_{ch}$ characteristic driving speed.

These equations can be illustrated as follows in a simplified form:

$$y_1 = k_1 * y_2 \text{ and } y_3 = k_2 * y_1$$

wherein $k_1$ and $k_2$ are two constants responsive to a vehicle reference speed, and $y_1$, $y_2$, and $y_3$ designate the yaw rate, the steering wheel angle, and/or the transverse acceleration.

At a constant vehicle reference speed, $$\Delta y_1 = k_1 * \Delta y_2 \text{ and } \Delta y_3 = k_2 * \Delta y_1$$

will apply. In this equation, $\Delta y_1$, $\Delta y_2$, and $\Delta y_3$ refer to variations of the sensor signals which, as has already been explained hereinabove, play an important role in the analysis of characteristics and, thus, in the detection of connecting errors.

Further, it is likely that in practical operations connecting errors will never occur in more than one ESP sensor at the same time. Thus, it can be assumed for error detection that only one of the three ESP sensors will suffer from a connecting error at a given moment. This can improve the reliability of error detection to a major degree. The plausibility test for detecting a connecting error which will be described hereinbelow can be applied on this basis:

Failfree operation can be assumed to prevail when the following conditions apply:

$$\Delta y_i \neq 0 \text{ for } i=1, 2, 3 \text{ or } \Delta y_i = 0 \text{ for } i=1, 2, 3$$

When, however, one of the variations of the sensor output signals is equal to zero and the other variations are unequal to zero, it must be assumed that an error exists:

$$\exists j \in \{1,2,3\}, \Delta y_j = 0 \text{ and } \Delta y_i \neq 0, \forall i \neq j$$

wherein i, j designate the sensors respectively. Two facts must be taken into account for a practical realization of these principles: on the one hand, the interrelationship between the three ESP sensors during slalom maneuvers can be represented only with a certain degree of inaccuracy due to the phase shift of the sensor signals; on the other hand, the sensor signals, as mentioned hereinabove, cannot remain absolutely constant due to noises.

This requires a practical conversion of the above-described plausibility test which has a high degree of rigidity relative to the mentioned inaccuracies, on the one hand, and satisfies the demands placed on the sensitivity with respect to the connecting error, on the other hand. Two measures have proven to be favorable to reach this aim:

On the one hand, the time variations are not taken into account for the evaluation of the variations of the sensor signals. Instead, the absolute value of the time derivative of the sensor signals over a period of time $t \in (t_1, t_2)$ is integrated, and namely according to the following equation:

$$\Delta y_i = \int_{t_1}^{t_2} \left| \frac{dy_i(t)}{dt} \right| d\tau \text{ for } i = 1, 2, 3$$

Threshold values are introduced, on the other hand. Two monitoring thresholds are defined for each sensor, that is, a low threshold $S_L$: when $\Delta y_i < S_{Li}$, this means that the variation of $y_i$ is of no special interest and, thus, $y_i$ can be regarded as constant, and a high threshold $S_H$: when $\Delta y_i > S_{Hi}$, this means that a corresponding measured quantity is applied to the sensor, i.e., that a time-variable transverse dynamics (slalom maneuver) prevails in the case of the transverse acceleration sensor, for example.

To achieve a high rate of sensitivity for a possible connecting error, both threshold values should be kept as low as possible.

On the basis of these two measures, monitoring of the sensors can take place during driving according to the following criteria: a failfree operation can be assumed when $$\Delta y_i > S_{H_i} \forall i \in \{1,2,3\} \text{ or } \Delta y_i < S_{L_i} \forall i \in \{1,2,3\}$$

applies. On the other hand, a fault in a sensor is supposed to prevail when $$\exists j \in \{1,2,3\}, \Delta y_j < S_{L_j} \text{ and } \Delta y_i > S_{H_i} \forall i \neq j$$

applies. There is the restriction in this respect that a connecting error of a sensor possibly cannot be detected at a point of time where the other sensor output signals are constant.

FIG. 1 shows a schematic block diagram of a corresponding circuit which generally can also be realized with a program. The output signals of the three ESP sensors 10, 11, 12 (transverse acceleration sensor, steering angle sensor, and yaw rate sensor) are respectively sent to a low-pass filter 13, 14, 15, the output signals of which are applied to a first device 16 in order to determine the time variations. Device 16 includes a differentiator associated with each sensor for the time derivative of the output signals of the sensors and an integrator for the integration of the quality of the time derivative of the output signals. The thereby determined variations $\Delta y_i$ are sent to a second device 17 by which they are compared with the threshold values $S_{Hi}$, $S_{Li}$ and undergo a plausibility test, and which produces an error signal FM, as the case may be.

To determine the variations $\Delta y_i$ of the sensor signals, the above-mentioned time derivative and the calculation of integrals is transformed into a time-discrete form where the derivative is replaced by the amount of the difference between two measured values during a sampling time and the calculation of integrals is replaced by a summation during a monitoring window. When the sampling time is referred to as $\Delta t$, the measured value $y_i(t)$ at the time $t=k\Delta t$ as $y_i(k)=y_i(k)t$, i=1, 2, 3, and the monitoring window as $(k_1\Delta t, k_2\Delta t)$, then the following equation is achieved:

$$\Delta y_i = \sum_{k_1}^{k_2} \left| \frac{y_i(k+1) - y_i(k)}{\Delta t} \right| \text{ for } i = 1, 2, 3$$

This monitoring process can be performed in a programmed way by programming a microprocessor unit 16 correspondingly.

The detected variations of the sensor signals are then compared in respectively one comparison and evaluation device 17 for each sensor signal with the respective monitoring thresholds $S_{Li}$, $S_{Hi}$ for each sensor i. When the result of the plausibility test described hereinabove is that one of the deviations is zero, while all other deviations are unequal to zero, an error message is produced.

FIGS. 2 and 3 show two examples for different time variations of the sensor output signals and the error signal.

Figure 2A:
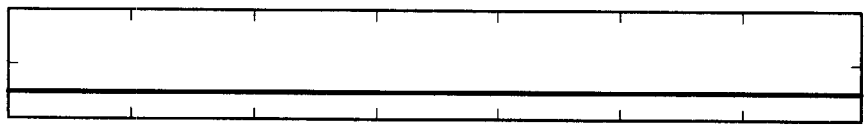
FIGS. 2a to 2d show different signal courses for a first driving condition.
Figure 2B:
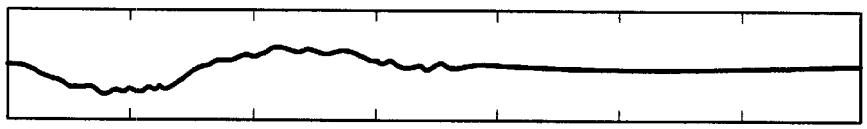
Figure 2C:
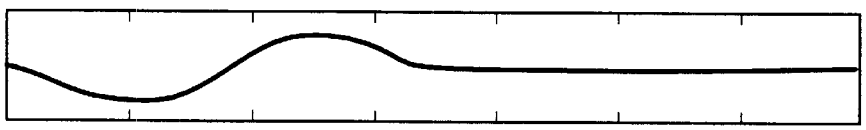
Figure 2D:
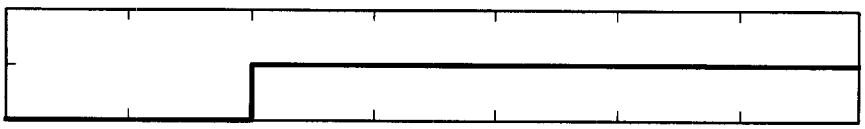

FIG. 2a shows the output signal of the yaw rate sensor, FIG. 2b shows the output signal of the transverse acceleration sensor, FIG. 2c shows the output signal of the steering angle sensor, and FIG. 2d shows an error message.

It may be deduced from the courses of the output signals of the transverse acceleration sensor and the steering angle sensor that the driver performs a slalom maneuver. Because the variation of the output signal of the yaw rate sensor within a sampling time of e.g. 2 seconds remains lower than its low threshold, however, the variations of the signals of the transverse acceleration sensor and steering angle sensor are higher than their high thresholds, a connecting error of the yaw rate sensor is assumed to be likely, and the error message is produced.

Figure 3A:
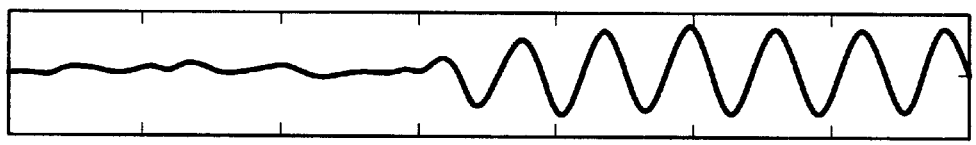
FIGS. 3a to 3d show different signal courses for a second driving condition.
Figure 3B:
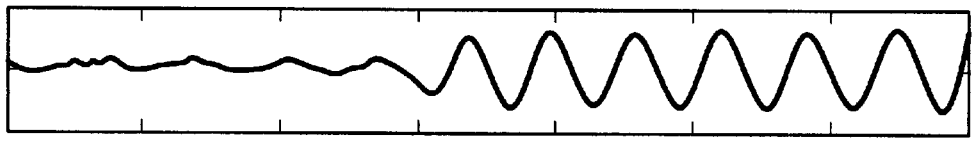
Figure 3C:
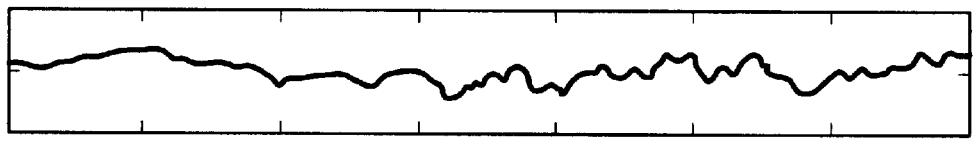
Figure 3D:

FIGS. 3a to 3c show the output signals of the same sensors as in FIGS. 2a to 2c, and the vehicle is driving straight on a rough road section in this case. Additionally, the variations of all three ESP sensors are in excess of their low thresholds. Therefore, it is supposed with the monitoring process that none of the sensors suffer from a connecting error, and an error message (FIG. 3d) is not produced.

The foregoing discussion discloses and describes preferred embodiments of the invention. One skilled in the art will readily recognize from such discussion and from the accompanying drawings and claims, that changes and modifications can be made to the invention without departing from the true spirit and fair scope of the invention as defined in the following claims. The invention has been described in an illustrative manner, and it is to be understood that the terminology that has been used is intended to be in the nature of words and description rather than of limitation.

What is claimed is:

1. A method of monitoring a plurality of sensors for providing inputs for an electronic driving stability program (ESP) for vehicles, the sensors including a yaw rate sensor, a transverse acceleration sensor, and a steering angle sensor, the method comprising:

detecting time variations of the output signals of the sensors, the variations of the output signals of the sensors being respectively determined by integration of the absolute value of the time derivative of the output signals for a predeterminable period of time, comparing and testing the variations in view of their plausibility which is determined by the dependencies of the sensor output signals when the variations of the output signals of the sensors either are all unequal to zero or all equal to zero, and producing an error message in the absence of plausibility.

2. A method as claimed in claim 1, wherein the time derivative is achieved in a time-discrete form by differentiations between two output signals during a sampling time, and the integration is performed by summation during a monitoring window.

3. Method as claimed in any one of claims 1 to 2, characterized in that the variations of the sensor signals are compared with a first low threshold value (low threshold) and a second higher threshold value (high threshold).

4. A device for monitoring a plurality of sensors, comprising:

at least one first device for detecting time variations of the output signals of the sensors, the first device including a differentiator with each sensor for the time derivative of the output signals of the sensors and an integrator for the integration of the quantity of the time derivative of the output signals, and a second device for comparing and testing the variations in view of their plausibility which is determined by the dependencies of the sensor output signals when the variations of the output signals of the sensors either are all unequal to zero or all equal to zero, and for producing an error message in the absence of plausibility.

5. A device as claimed in claim 4, wherein associated with each sensor is a low-pass filter by which the sensor output signals are filtered and subsequently sent to the first device.

6. A device as claimed in claim 5, further comprising a microprocessor unit controlling an electronic stability system, wherein the sensors comprise a yaw rate sensor, a transverse acceleration sensor, and a steering angle sensor, and the first and second devices are each a subprogram implemented in the microprocessor unit.

7. A method of monitoring a plurality of sensors for providing inputs for an electronic driving stability program (ESP) for vehicles, the sensors including a yaw rate sensor, a transverse acceleration sensor, and a steering angle sensor, the method comprising:

detecting time variations of the output signals of the sensors, the variations of the output signals of the sensors being respectively determined by integration of the absolute value of the time derivative of the output signals for a predeterminable period of time, comparing and testing the variations in view of their plausibility which is determined by the dependencies of the sensor output signals, and producing an error message in the absence of plausibility.

\* \* \* \* \*

UNITED STATES PATENT AND TRADEMARK OFFICE
CERTIFICATE OF CORRECTION

PATENT NO. : 6,594,563 B1
DATED : July 15, 2003
INVENTOR(S) : Eve Limin Ding

It is certified that error appears in the above-identified patent and that said Letters Patent is hereby corrected as shown below:

<u>Title page,</u>
Item [30], Foreign Application Priority Data, please change "199 06 795" to read -- 199 06 795.3 --, and "199 36 434" to read -- 199 36 434.6 --.

<u>Column 6,</u>
Line 16, please change Claim 3 to read as follows:

-- A method as claimed in Claim 1 wherein the variations of the sensor signals are compared with a first low threshold value (low threshold) and a second higher threshold value (high threshold). --.

Signed and Sealed this

Twenty-third Day of December, 2003

JAMES E. ROGAN
*Director of the United States Patent and Trademark Office*